INVENTORS:
John S. Barnett
Walter J. Karplus

Attorneys

Nov. 21, 1961

J. S. BARNETT ET AL 3,010,024

MISSILE TRACKING SYSTEM

Filed June 11, 1959

INVENTORS:
John S. Barnett
Walter J. Karplus

By Smyth & Roston
Attorneys

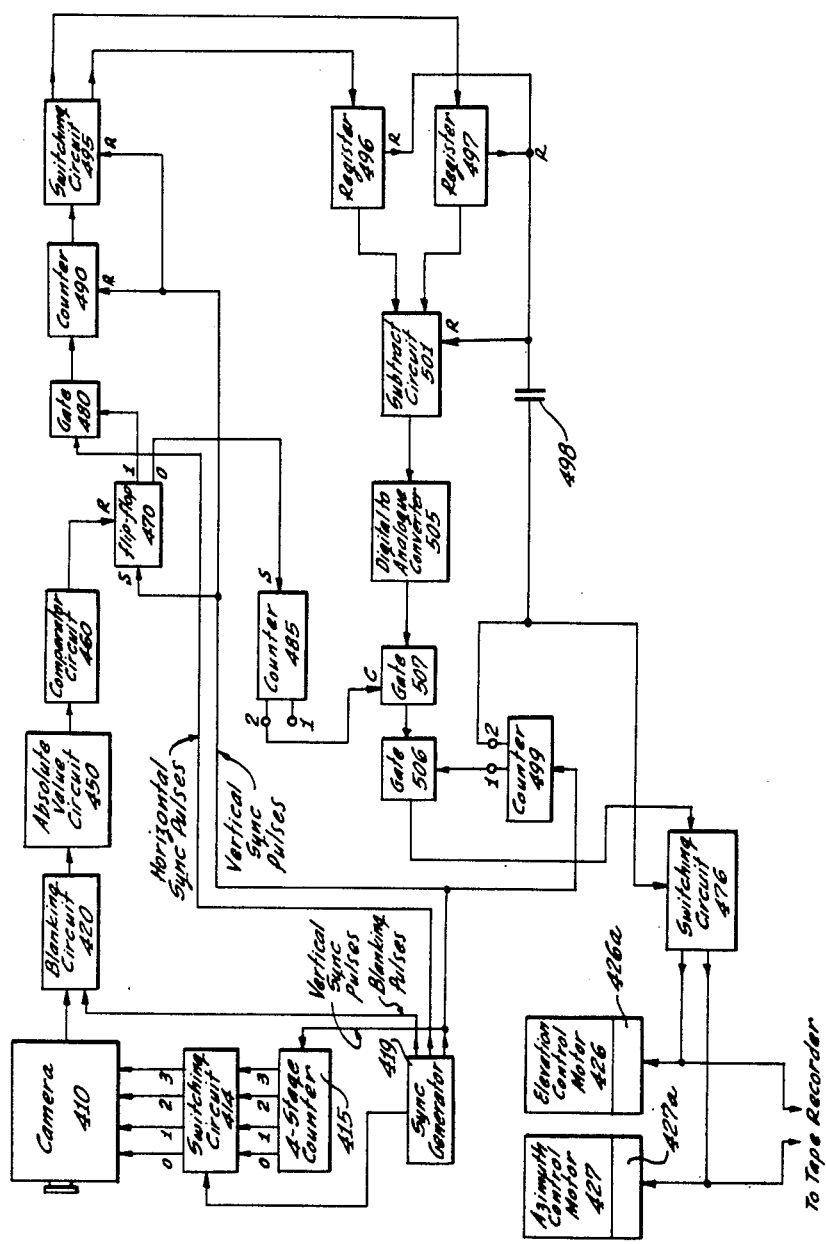

United States Patent Office 3,010,024
Patented Nov. 21, 1961

3,010,024
MISSILE TRACKING SYSTEM
John S. Barnett, Sepulveda, and Walter J. Karplus, Los Angeles, Calif., assignors to Photographic Analysis, Inc., Hollywood, Calif., a corporation of California
Filed June 11, 1959, Ser. No. 819,707
21 Claims. (Cl. 250—203)

This invention relates to a tracking system for high speed moving vehicles such as aircraft and missiles and, more particularly, to a system utilizing visible light to detect and track the moving vehicle.

Ground tracking or external, non-telemetering systems have been developed for high speed moving vehicles utilizing radar, infrared and visible light communication media to determine the tracking error. In order to provide sufficiently useful information, the tracking system should be both accurate and rapid. Though radar equipment has a high rate of response, the information provided thereby is often unreliable, and, infrared equipment is both slow and insufficiently accurate. Visible light equipment, which are capable of providing information of usable accuracy, have heretofore utilized photographic methods where the information is available only after time consuming operations of data reduction. In these systems, photo-theodolites, which are combined camera and telescope devices, positioned at predetermined spaced locations are synchronously operated to successively photograph the moving vehicle. Though the photo-theodolites are manually operated to track the moving vehicle, and though the delays necessary to develop the photographs and then manually reduce the data from the photographs are considerable, these systems are currently preferred because of the accuracy of the results.

In a specific illustrative embodiment of this invention, a high speed tracking and tracking error indicating system is provided which utilizes visible light as the communication medium taking advantage of the inherently high resolution characteristics of visible light equipment. Photographic procedures and accompanying data reduction are not required and the tracking system responds to an error of a tracking telescope with sufficient rapidity to automatically adjust its position and compensate for the error even when high-speed missiles are being tracked.

The tracking and error indicating system includes an adjustable telescope or theodolite which provides a visible image of the moving vehicle to an optical beam splitter. The beam splitter supplies four identical theodolite fields including an image of the moving vehicle to four television cameras. The cameras are oriented with respect to the theodolite field so that the scanning rasters of the four camera tubes are orthogonally oriented or at 90 degree intervals.

The four cameras are synchronously operated by a synchronizing generator which supplies scanning, blanking and synchronizing pulses thereto. The conventional television interlaced scanning in use today in the United States is not utilized herein though the scanning and frame speeds and the number of lines for each frame may be the same as in conventional television systems. Each frame of successive scanning lines, for example, includes 525 lines with the frame repetition rate being 30 times per second. The four identical images of the moving vehicle are, in this manner, scanned in four different, 90 degree oriented, directions 30 times a second. Due to the different orientations, the field provided to the beam splitter is effectively scanned line by line from the left, the right, the top and the bottom by the four orthogonally oriented cameras.

The television signals from the cameras are coupled to individually associated comparator circuits which provide an output signal when the magnitude of the television signals from the cameras exceed a predetermined value. The output signals from the four comparator circuits are utilized to reset four individually associated flip-flop circuits which are periodically set by the vertical synchronizing pulses from the synchronizing generator.

During each scanning frame each of the four flip-flop circuits remains set, therefore for an interval commencing with a vertical synchronizing pulse and terminating upon the first occurrence of an output signal from the associated comparator circuit during the frame. The first output signal occurs when the moving vehicle is first scanned or detected in a line scan by the associated camera. Since the four cameras scan the viewed image in four different orthogonal directions, the four flip-flop circuits will remain set for different durations unless the moving vehicle is exactly centered in the viewed image. More specifically, two flip-flop circuits remain set for the same duration when there is no elevation error in tracking the vehicle, which is when the vehicle image is centered vertically in the field, and the other two flip-flop circuits remain set for the same duration when there is no azimuth error, which is when the vehicle image is centered horizontally in the field.

Each of the flip-flop circuits control an individually associated gate to which counting pulses, which may be the horizontal synchronizing pulses, are supplied. The counting pulses are coupled through the gates to individually associated counters during the time the associated flip-flop circuits are set. The number of pulses which are counted, therefore, depends upon the length of the field scanned by the associated camera before the moving vehicle is detected. Two of the counters supply indications of the number of pulses supplied thereto to one set of adding and subtracting circuits, and the other two counters supply indications of the number of pulses supplied thereto to a second set of adding and subtracting circuits. The two counters controlling the one set are controlled by the two cameras which scan the frame, horizontal line by horizontal line, one from the top and the other from the bottom right, so that the associated subtracting circuit accordingly provides an indication of the tracking elevation error. The other two cameras control the subtracting circuit in the second set so that it provides an indication of the azimuth error. The adding circuits function to provide an alarm indication when the total of counting pulses registered by either the set of elevation counters or azimuth counters is greater than the number of counting pulses provided during one scanning frame. These error signals as indicated by the subtracting circuits are utilized to control azimuth and elevation control motors coupled to the telescope. In this manner, any error of the tracking telescope is automatically compensated by automatically maintaining the image of the moving vehicle centered in the theodolite field.

Further features of this invention relate to the provision of an auxiliary telescope which is mounted with the main telescope and which provides an indication of the background light intensity adjacent the moving vehicle. The image of the background is coupled to photoelectric means which generates an electrical signal to indicate the intensity of the background. The electrical signal is coupled to four differential amplifiers to which the video signals from the four cameras are also individually provided. The differential amplifiers effectively improve the signal-to-noise ratio by reducing the background signal of the video signals to zero.

Still further features of this invention pertain to the provision of automatic tracking systems which utilize respectively, two television cameras and a single television camera instead of four cameras as indicated above. The frame frequency is not changed but each of a number of the successive frames are scanned in different directions so that after two frames when two cameras are used, or four frames when one camera is used, the azimuth and elevation errors may be derived.

Further features and advantages of this invention will become apparent upon consideration of the following description when read in conjunction with the drawing wherein:

FIGURES 1 and 2, with FIGURE 1 arranged to the left of FIGURE 2, are a functional representation of one embodiment of the automatic tracking and error indicating system of this invention utilizing four cameras;

FIGURE 5 is a functional representation of a third embodiment of the automatic tracking and error indicating system of this invention utilizing one camera.

Figure 1:
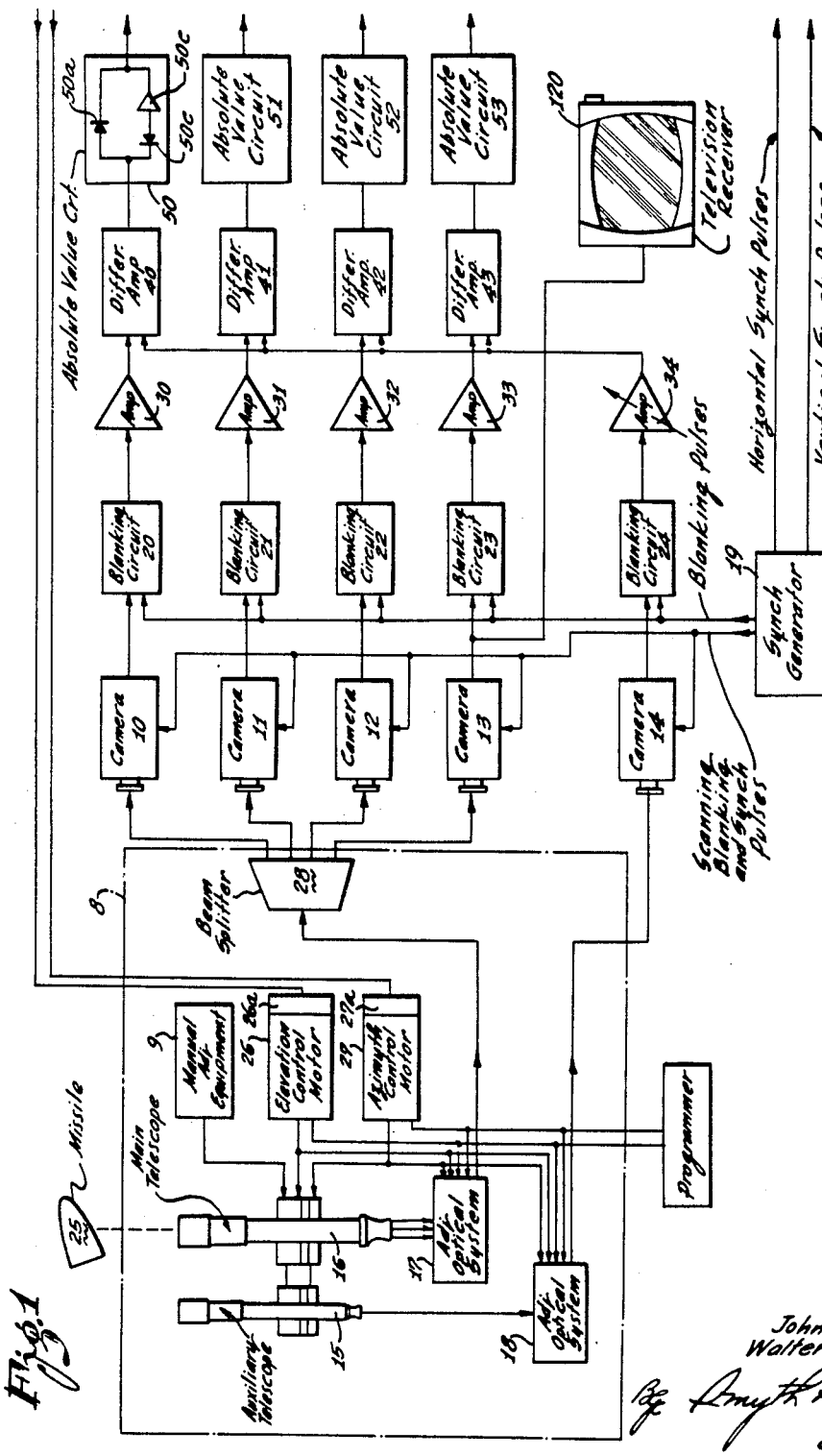
Figure 2:
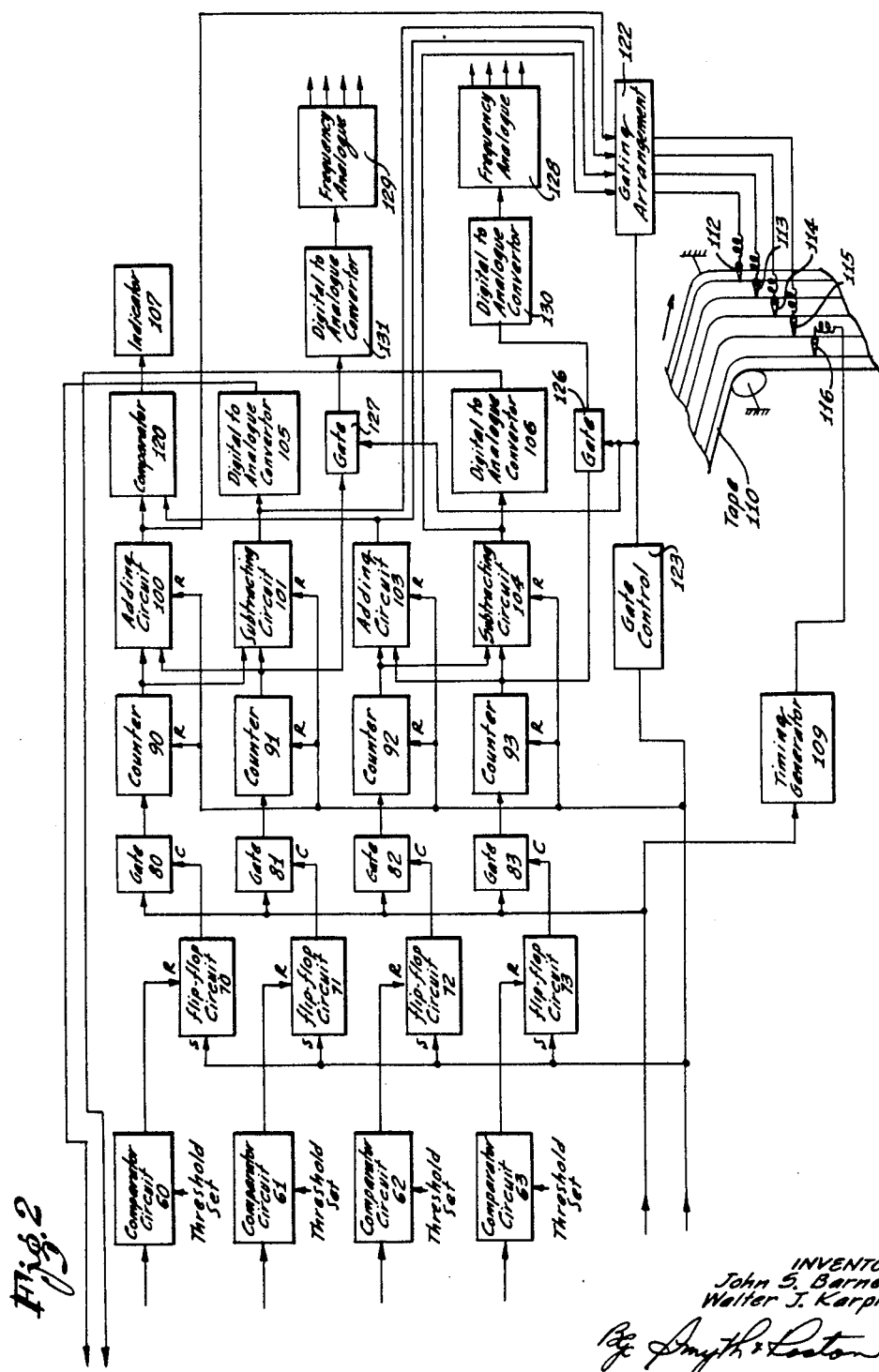

Referring first to FIGURES 1 and 2, the image of a moving vehicle 25, which may be a missile, is provided from a main telescope or theodolite 16 to an adjustable optical system 17. The main telescope 16 is mounted together with an auxiliary telescope 15 so as to be adjustable horizontally and vertically both by manual adjusting equipment 9 and by two control motors 26 and 27. The missile 25 is viewed by the main telescope 16 but not by the auxiliary telescope 15. The auxiliary telescope 15 views the background sky adjacent the missile 25. As is hereinafter described, the auxlary image of the background with which the missile image is contrasted is utilized to improve the signal-to-noise ratio of the video signals produced by four Vidicon tube television cameras 10, 11, 12 and 13.

The adjustable optical system 17 to which the main theodolite field including the image of the missile 25 is provided, and an adjustable optical system 18, to which the field of the auxiliary telescope 15 is provided, are adjusted by the manual adjusting equipment 9 or by the motors 26 and 27 together with the telescopes 15 and 16. In the absence of a tracking error, the motors 26 and 27 and the systems 17 and 18 are controlled in accordance with a predetermined program under control of the programmer 7. The position of the telescope 16 is controlled in this manner in accordance with a predetermined flight plan of the missile 25. The optical systems 17 and 18 consist essentially of adjustable reflective surfaces, not shown, which reflect the images provided thereto respectively to a beam splitter 28 and to a television camera 14.

The theodolite field from the main telescope 16 is coupled through the optical system 17 and the beam splitter 28 to the faces of the television cameras 10 through 13. The four theodolite fields provided by the beam splitter 28 are identical. Such beam splitters are conventional in the art and may consist, for example, of three, 50 degree, transmission first surface illuminized mirrors, not shown. The optical systems 17 and 18 and the beam splitter 28 may be mounted with the telescopes 15 and 16, forming a telescopic and optical system designated generally at 8. The systems 17 and 18 insure that the main field is provided to the four cameras 10 through 13 and that the auxiliary field is provided to an auxiliary camera 14 independent of the azimuth and elevation angles of the telescopes 15 and 16.

Each of the four identical theodolite fields is scanned by one of the four television cameras 10 through 13. The cameras 10 through 14 are conventional television cameras including for example type 6326 tubes, not shown, known as Vidicon tubes. Vidicon tubes are small, simple and rugged having a circular face approximately one inch in diameter and a length of approximately 6.25 inches.

The cameras 10 through 14 are controlled by a synchronizing generator 19 which supplies thereto scanning, blanking and synchronizing pulses. The scanning sequence of the cameras 10 through 13, as controlled by the synchronizing generator 19, may be similar to that utilized in conventional television systems except that interlaced scanning is not utilized. Each frame consists of 525 successive scanning lines and each frame of 525 parallel lines is scanned 30 times each second. The resolution of the system is improved by increasing the number of scanning lines in each frame. The present invention is not restricted to any particular number of lines.

Figure 3:
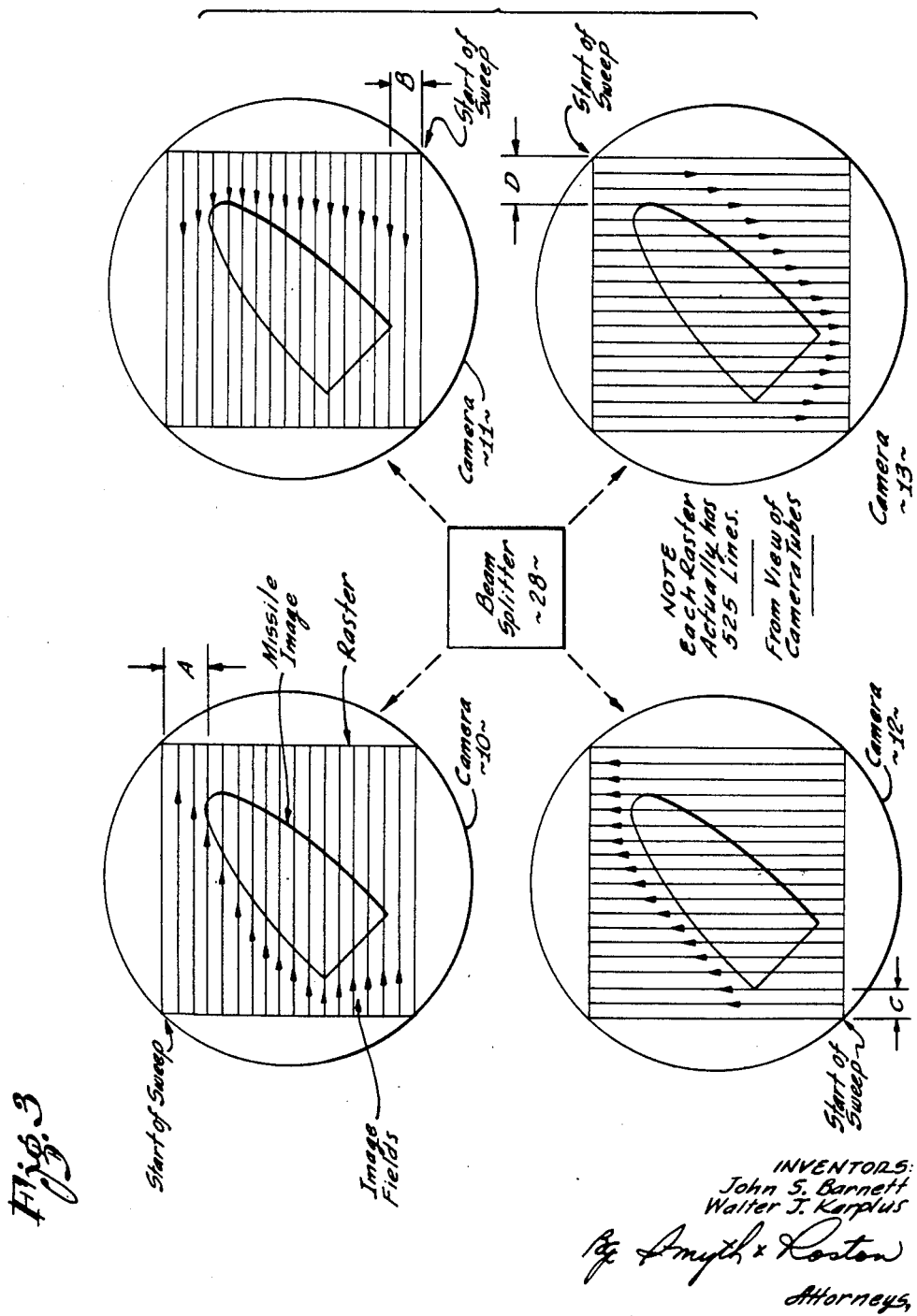
FIGURE 3 is a diagrammatic representation of the faces of the four cameras illustrating the operation of the automatic tracking and error indication system of this invention.

Though each of the cameras 10 through 13 scans the identical theodolite field as provided from the beam splitter 28, the cameras 10 through 13 have been rotated to angular positions displaced by 90 degrees from each other so that each scans the image in a different direction. FIGURE 3 illustrates the orientation of the cameras 10 through 13 and the scanning directions. The camera 10 scans the field, line by line, from the top to the bottom in a manner which is conventional in television systems. The scanning direction of each line is from the left to the right. The camera 11 which is effectively rotated by 180 degrees from the camera 10 with respect to the viewed field, scans the viewed field line by line from the bottom to the top with the scanning direction of each line being from the right. The scanning direction of each line of the camera 12 is upward with the scanning lines progressing line by line from the right to the left whereas the reverse scanning direction is utilized for the camera 13. In camera 13, the scanning direction of each line is from the top with the scanning lines progressing line by line from the right to the left. In this manner, though the theodolite field presented to each of the four cameras 10 through 13 is identical, due to the orientation of the cameras 10 through 13, the output television signals are different.

The output television signals from each of the cameras 10 through 13 includes the blanking and synchronizing pulses as well as the video signals representing the viewed field. The signals from the cameras 10 through 13 are introduced respectively to blanking circuits 20 through 23 which are gated by the synchronizing generator 19 to remove the blanking and synchronizing pulses from the output signals of the cameras 10 through 13. The video output of any one of the cameras 10 through 13 may also be introduced to a monitor television receiver 120. As shown in FIGURE 1, the signals from the camera 13 are introduced to the receiver 120. The receiver 120, which may proximately or distantly be located with respect to the cameras 10 through 13, provides the theodolite field in visible form to an observer.

The television signals from the blanking circuits 20 through 23 are coupled respectively from the circuits 20 through 23 through amplifiers 30 through 33 to differential amplifiers 40 through 43. Each of the differential amplifiers 40 through 43 is essentially a subtracting circuit with one input being provided thereto from the associated cameras 10 through 13 and the other input being provided thereto from the auxiliary camera 14. Instead of the auxiliary camera 14, photoelectric equipment may be utilized which has the same optical characteristics as the cameras 10 through 13.

As described above, the illumination received at the auxiliary camera 14 is provided from the auxiliary telescope 15 through the adjustable optical system 18. An image of a field representing the contrasting background for the image of missile 25 is, in this manner, provided to the camera 14.

The signals from the auxiliary camera 14 are introduced to a blanking circuit 24 which is synchronously operated with the blanking circuits 20 through 23. An output signal is therefore not provided from the circuit 24 during the blanking pulses from the synchronizing generator 19. The electrical signals from the camera 14, as interrupted by the blanking circuit 24, are coupled through an adjustable amplifier 34 to the differential amplifiers 40 through 43. The differential amplifiers 40 through 43 function to subtract the auxiliary signals representing the background sky from the video signals representing the theodolite field. The background which represents noise in the signals from the cameras 10 through 13 is, in this manner, reduced substantially to zero. The ratio of the output signal-to-noise from the differential amplifiers 40 through 43 is in this manner materially improved.

The signals from the differential amplifiers 40 through 43 are coupled to absolute value circuits 50 through 53, respectively, which provide an identical signal independent of the relative contrast between the missile and its background. In other words, a similar signal is provided for a light contrast and a dark missile as for a dark contrast and a light missile. The absolute value circuits 50 through 53 may, for example, be full wave rectifiers providing positive output pulses independent of the polarity of the input pulses supplied thereto. A full wave rectifier is illustrated in the circuit 50 which includes two oppositely poled diodes 50a and 50b. The negative signal through the diode 50b is phase reversed by the amplifier 50c so that only positive signals appear at the output of the circuit 50.

The rectified signals from the circuits 50 through 53 are introduced respectively to comparator circuits 60 through 63 which provide an output signal only when the magnitude of the signal introduced thereto exceeds a predetermined value. In the event the relatively light density of the missile 25 and the background sky are reversed, the circuits 60 through 63 may be adjusted to respond only when the signals fall below a predetermined threshold value. The comparator circuits 60 through 63 include manual controls for adjusting the threshold value for passing signals from the circuits 60 through 63. An output is provided from the circuits 60 through 63 respectively only when the magnitude of the signal introduced thereto indicates a change from background scanning to the missile scanning. In other words, as long as the background sky is being scanned, an output is not provided from the comparator 60 through 63. At the instant that any one of the cameras 10 through 13 scans the missile 25, its associated comparator circuits 60 and 62 provide an output pulse.

The output pulses from the comparator circuits 60 through 63 are coupled respectively to the reset terminals R of independently associated flip-flop circuits 70 through 73. The flip-flop circuits 70 through 73 are bistable trigger circuits which remain in either of their bistable conditions unless triggered to the other. The flip-flop circuits 70 through 73 are set at the beginning of each scanning frame of the cameras 10 through 13 by the vertical synchronizing pulses from the synchronizing generator 19. Each of the flip-flop circuits 70 through 73 remain set, therefore, for an interval dependent upon the first occurrence of an output signal from the associated one of the comparator circuits 60 through 63. The first occurrence of an output signal is when the missile 25 is first scanned by the associated one of the cameras 10 through 13. Since the four cameras 10 through 13 scan the field including the image of the missile 25 in four different orthogonal directions, the four flip-flop circuits 70 through 73 will remain set for different durations unless the missile 25 is exactly centered in the viewed image. More specifically, the flip-flop circuits 70 and 71 remain set for the same duration if the image of the missile 25 is vertically centered in the field so that there is no elevational error, and the flip-flop circuits 72 and 73 remain set for the same duration if the image of the missile 25 is horizontally centered in the field so that there is no azimuth error.

The flip-flop circuits 70 through 73 control individually associated gates 80 through 83 which are each enabled only during the time the associated one of the flip-flop circuits 70 through 73 is set. During the time any one of the gates 80 through 83 is enabled, it permits the passage of counting pulses which may be the horizontal synchronizing pulses from the synchronizing generator 19. In the embodiment of this invention shown in FIG. 4 and hereinafter described counting pulses at a repetition rate of 157,500 pulses per second are utilized. The counting pulses pass through each of the enabled ones of the gates 80 through 83 to binary counters 90 through 93. The binary counters 90 through 93, therefore, count the number of horizontal synchronizing pulses which pass through the associated gates 80 through 83. The number of pulses counted by each of the binary counters 90 through 93 is, therefore, an indication of the duration during which the associated one of the flip-flop circuits 70 through 73 is in its set condition, which is also an indication of the length of the field scanned before the missile 25 is detected.

The registration of the counters 90 through 93 are selectively provided to two adding circuits 100 and 103 and two subtracting circuits 101 and 104. The subtracting circuit 101 provides a continuous indication of the difference in registration between the counters 90 and 91, and the subtracting circuit 104 provides a continuous indication of the registration of the counters 92 and 93. The subtracting circuit 101, therefore, provides a binary indication of the tracking elevation error of the main telescope 16. If the image of the missile 25 is not vertically centered in the theodolite field, being, for example, at a position toward the top of the field, the registration of the counter 91 will be larger than that of the registration of the counter 90. The counter 90 is controlled by the camera 10 which as shown in FIG. 3 scans the field line by line from the top. The counter 90 therefore provides an indication of the vertical dimension A from the top of the field to the missile image. The counter 91, which is controlled by the camera 11, provides an indication of the vertical dimension B as shown in FIG. 3 from the bottom of the field to the missile image.

The subtracting circuit 101 provides an indication of the difference between the registered vertical dimensions A and B and therefore an indication of the elevation error. The subtracting circuit 101 also provides an indication of which registration in the counters 90 and 91 is larger. To illustrate the operation of the subtracting circuit 101, assume that the dimension A represents 150 horizontal scanning lines with the missile image being first scanned during the 150th scan, and the dimension B representing 200 horizontal scanning lines. The output of the circuit 101 is 200 minus 150 which is 50 together with an indication that it is the dimension B which is larger. In order to correct the error, it will be necessary to reduce the elevation angle to cause a shift of the missile image in the field by a distance corresponding to 25 horizontal lines so that it will be vertically centered.

The output of the subtracting circuit 101 remains at zero during the first 150 scanning lines since the two counters 90 and 91 register the same number as line after line is scanned. Starting with the 151st line when the counter 90 is halted, an output error signal is provided from the circuit 101 which is progressively increased until the 200th line is scanned when the counter 91 is halted. From the 201st line until the next vertical synchronizing pulse when the counters 90 and 91 and the circuit 101 are reset, the output from the circuit 101 remains the same. The circuits 100, 101, 103 and 104 may be accumulation type of counters so that a connection could be provided from the gates 80 through 83 directly to the circuits 100, 101, 103 and 104. The counters 90 through 93, which would not then be necessary, would be omitted.

As indicated above, at the same time that the counters 90 and 91 are operating to determine the elevation error, counters 92 and 93 are operated to provide binary registrations to the subtracting circuit 104 which represent respectively the horizontal dimensions C and D in FIGURE 3. The subtracting circuit 104 therefore provides a binary digital number representing the azimuth error. The binary digital error indications from the subtracting circuits 101 and 104 are introduced to analog converters 105 and 106 which provide an analog form continuous indications of the elevation and azimuth errors. The analog potentials from the converters 105 and 106 are coupled respectively to the motors 26 and 27 which, as described above, adjust the position of the telescopes 15 and 16 and also the optical systems 17 and 18 in accordance with the analog signals. The correction voltages may as described above be modifications in the tracking program as determined by the programmer 7. The elevation and azimuth errors determined, therefore, by counting the number of scanned lines before the missile 25 is detected in the viewed image, are utilized in a feedback arrangement to automatically control the visible light tracking equipment. An error signal is provided to the motors 26 and 27 commencing when the associated counter circuits 90, 91 and 92, 93 register different numbers and terminating with the next vertical synchronizing pulse. For the illustration described above where A in FIG. 3 is 150 lines and B is 200 lines, an elevation error signal commences $$\frac{150}{525} \text{ of } \frac{1}{30}$$

of a second, which is 0.0095 seconds, in the scanning frame and increases in steps for 50 lines or for a duration of $$\frac{50}{525} \times \frac{1}{30}$$

which is 3.16 milliseconds. From 3.16 milliseconds in the frame until the next vertical synchronizing pulse at the end of the frame approximately $$\frac{225}{500} \times \frac{1}{30}$$

or 15 milliseconds later, the full elevation error signal is provided to the motor 26.

The following two effects are inherent in the operation for developing the error signals:

(1) When the image of the missile 25 is relatively large in the theodolite field the commencement of an error signal occurs sooner in the scanning frame; and (2) For relatively large tracking errors, the error signals are initiated earlier in the scanning frame.

When high speed moving vehicles are being tracked these two effects are important. The missile image is relatively large when the missile 25 is closer to the telescope 16 which is when the azimuth and elevation angles change more rapidly. The duration during which the tracking error is provided is in general proportional to the magnitude of the error because the smaller the dimension A in FIGURE 3 in the above illustration, the earlier in the scanning frame is the error signal initiated.

The duration for supplying the error signals to the motors 26 and 27 may be increased by utilizing the storage circuits 26a and 27a, which are associated individually with the motors 26 and 27. For example, the duration may be extended through the vertical blanking interval.

The binary signals from the subtracting circuits 101 and 104 are also coupled respectively to two magnetic recording heads 113 and 115 for recording in two of five longitudinal tracks on a moving tape 110. The binary signals representing the sum of the registration of the counters 90 and 91 are provided from the adding circuit 100 to the recording head 112, and binary signals representing the sum of the counters 92 and 93 are provided from the adding circuit 103 to the recording head 114.

The signals from the circuits 100, 101, 103 and 104 are provided respectively to the recording heads 112, 113, 114 and 115 under control of a gating arrangement 122. The circuit 122 is enabled just before each vertical synchronizing pulse from the generator 19 by a gate control circuit 123. The circuit 123, which may be a delay or counter arrangement, is driven by the vertical synchronizing pulses from the generator 19. In this manner, before the circuits 100, 101, 104 and 105 are reset, a recording is provided on the tape 110.

The control circuit 123 also operates two gates 127 and 126 to supply respectively the analog signals from the counters 91 and 93 to digital-to-analog converters 131 and 130. The analog signals are provided respectively to frequency analyzers 129 and 128. The frequency analyzers 129 and 128 each consist of a number of parallel bandpass filters, not shown, which recognize an oscillation over a number of scanning frames of the magnitudes of the dimensions B and D in FIGURE 3. If the missile 25 is tumbling, for example, end over end once each second, the dimensions B and D would vary at a frequency of 1 cycle per second even if there is no tracking error, the missile 25 being centered in the theodolite field. If the dimensions B and D varied because of a tracking error as well as a tumbling of the missile 25, a frequency component of 1 cycle per second would still be present and recognizable by the frequency analyzers 129 and 128.

The adding circuits 100 and 103 function as part of an alarm indicating arrangement for operating an indicator 107 when the registration of either of the adding circuits 100 and 103 is greater than 525, the number of horizontal lines in each scanning frame. If the output of either of the adding circuits 100 and 103 becomes greater than 525, it is an indication that the missile 25 is not included as part of the theodolite field. The only time that the total can be greater than 525 is when a signal is not provided from each of the cameras 10 through 13 during the scanning frame to halt the successive operation of the associated counters 90 through 93. The registrations in the adding circuits 100 and 103 are provided to an adjustable comparator circuit 120 which may be set to respond to indication total of 525. The comparator 120 operates the indicator 107 to provide the alarm indication.

As indicated above, and hereinafter described in reference to FIGURE 4, the repetition rate of the counting pulses may be larger. If a larger repetition rate is utilized the counters 90 through 93 and the circuits 100, 101, 103 and 104 are larger and the indicator 107 responds to a count spanning a duration of one-thirtieth of a second, the scanning frame duration.

The fifth track on the tape 110 is for timing pulses produced by a timing generator 109 and introduced therefrom to the recording head 115. The timing generator 109 may be controlled by the horizontal synchronizing pulses from the generator 197.

In the embodiment described above and shown in FIGURES 1 and 2, four Vidicon cameras 10 through 13 are utilized to scan the theodolite field. In the embodiment shown in FIGURE 4, only two cameras 210 and 211 are utilized, and as hereinafter described in the embodiment shown in FIGURE 5, only a single camera 410 is required. The various components in the embodiment shown in FIGURE 4 which are similar to components in FIGURES 1 and 2 have similar reference numbers with the addition of 200 thereto. For example, the camera 210 in FIGURE 4 is similar to the camera 10 in FIGURE 1. As shown in FIGURE 4, the telescopic and optical system 218 views the missile 225 and provides identical images of the missile to the two cameras 210 and 211. The cameras 210 and 211 are oriented 180 degrees from each other with respect to the theodolite field. In other words, the camera 210 provides for an indication of a dimension from the edge of the field to the missile whereas the camera 211 provides for an indication of a dimension from the opposite edge of the field to the missile.

The cameras 210 and 211 are driven by a synchronizing generator 210 which supplies thereto scanning, blanking and synchronizing pulses through a switching circuit 214. The switching circuit 214, which may include electronic components or electromagnetic components such as relays, is operated by the vertical synchronizing pulses from the generator 219. The vertical synchronizing pulses operate the switching circuit 214 to supply the scanning, blanking and synchronizing pulses from the generator 19 alternatively through the cables 212 and 213. When the cable 212 is utilized, the camera 210 scans the field from the left in a similar manner as indicated for the camera 10 in FIGURE 3 and the camera 211 scans the field to the right as indicated for the camera 11 in FIGURE 3. When the switching circuit 214 is operated so that the cables 213 is utilized, the scanning direction for the cameras 210 and 211 are rotated by 90 degrees so that the camera 210 scans the field from the bottom in a similar manner as indicated for the camera 12 in FIGURE 3, whereas the camera 211 scans the field from the top in a similar manner as indicated for the camera 13 in FIGURE 3. The operation of the switching circuit 214, in this manner, causes the horizontal and the vertical sequences to reverse. The switching arrangement 214 includes amplifiers, not shown, which are utilized when the signals are coupled to the cable 213 in order to adjust their levels in accordance with the different requirement of the horizontal and vertical deflection systems of the cameras 210 and 211.

Figure 4:
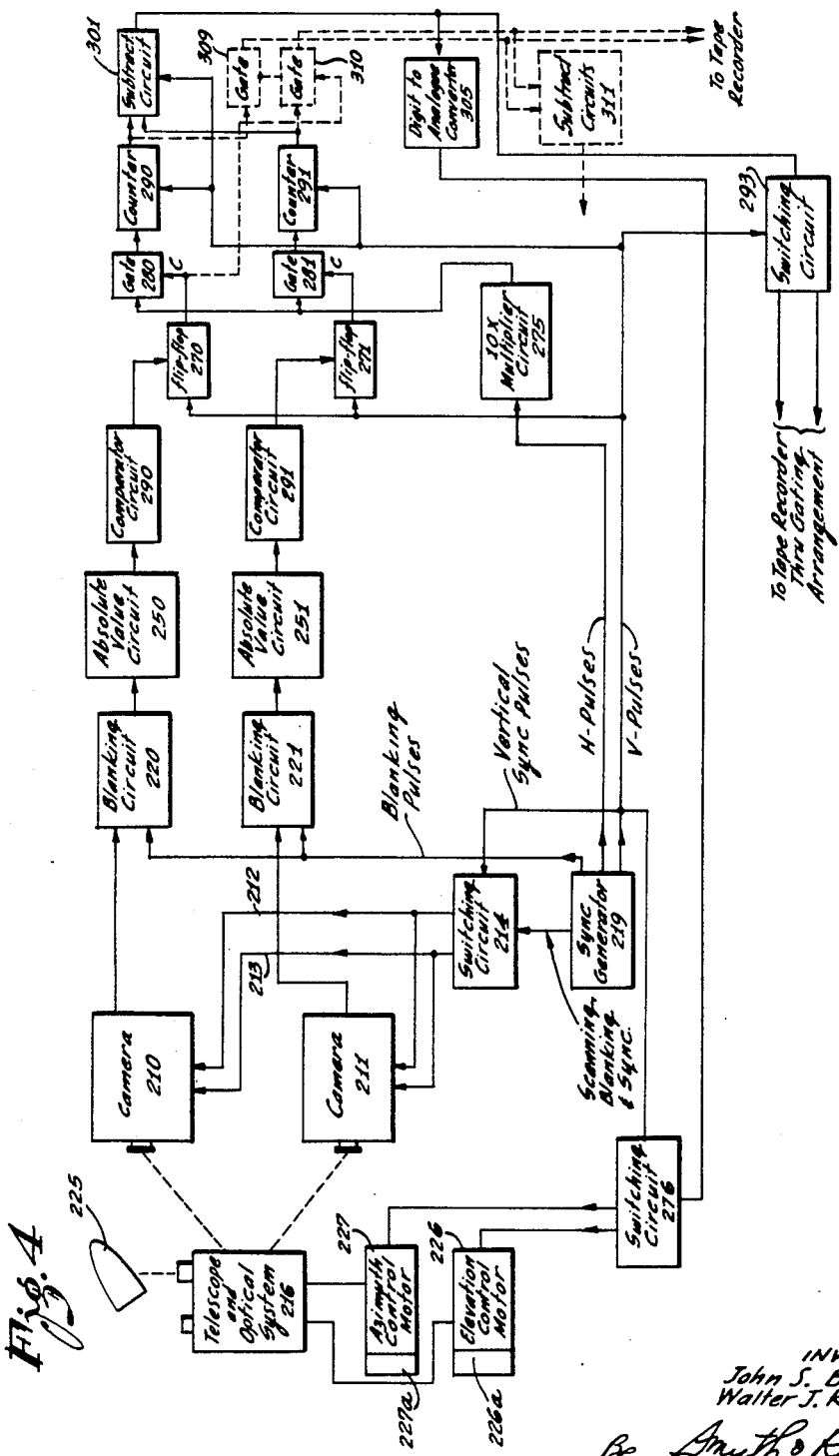
FIGURE 4 is a functional representation of a second embodiment of the automatic tracking error indicating system of this invention utilizing two cameras.

In the specific embodiment illustrated in FIGURE 4, the scanning direction of the cameras 210 and 211 are rotated 90 degrees. The scanning direction may be rotated 180 degrees instead of 98 degrees to determine the tracking errors. When a 180 degree rotation is provided, the determination of both errors is accomplished after every second frame, which storage means being required to store the scanning information of the first frames. Storage means of this type is described in reference to FIGURE 5 wherein is shown a single camera error determination system.

Assuming first that the camera 210 is scanning the field from the left in the manner indicated for the camera 10 in FIGURE 3, and the camera 211 is scanning the field from the right in the manner indicated for the camera 11 in FIGURE 3, the television signals are provided respectively from the cameras 210 and 211 to the blanking circuits 220 and 221. The blanking circuits 220 and 221, the absolute value circuits 250 and 251 and the comparator circuits 260 and 261 function in a manner similar to the corresponding components shown in FIGURES 1 and 2. The blanking circuits 220 and 221 effectively remove the blanking and synchronizing pulses; the absolute value circuits 250 and 251 provide for an output independent of the relative depth of the background to the missile; and the comparator circuits 260 and 261 function as threshold circuits to provide outputs only when the video signals exceed predetermined magnitudes.

The output signals from the comparator circuits 260 and 261, which indicate that the missile 225 is being scanned, are provided respectively to the reset terminals R of the flip-flop circuits 270 and 271. The flip-flop circuits 270 and 271 are set by the vertical synchronizing pulses from the generator 219 and reset respectively by the associated one of the comparator circuits 260 and 261 when the missile is detected by its associated camera. The circuits 270 and 271 control, respectively, the gates 280 and 281 to which are supplied counting pulses at a repetition rate which is ten times the repetition rate of the horizontal synchronizing pulses. The horizontal synchronizing pulses from the generator 219 are provided to a multiplier circuit 275 which provides the pulses at a repetition rate of 157,500 pulses per second to the gates 280 and 281. By utilizing counting pulses at an increased repetition rate the accuracy of the system is increased. The pulses of 157,50 pulses per second provide an indication not only of how many lines have been scanned before the missile is detected but also where along the particular detecting line it is detected.

In the above described illustration, the dimension A in FIGURE 3 is 150 lines and the dimension B is 200 lines. With a repetition rate of 157,500 pulses per second instead of 15,750 pulses per second, the missile image is detected by the camera 210 between 1500 and 1510 counting pulses in the frame and by the camera 21 between 2000 and 2010 pulses in the frame. Assume that the detection by the camera 210 is at the 1507th pulse and by the camera 211 at the 2006th pulse.

When either of the gates 280 and 281 is enabled, the counting pulses are coupled to individually associated counters or registers 290 and 291 which count the number of pulses provided thereto. The counter 290 registers the number 1507 in binary form and the counter 291 registers the number 2006 in binary form. The difference between the last digits of each of the registered numbers indicates an azimuth tracking error, and the difference between the rest of the numbers indicates the elevation tracking error. The elevation error is by 50 scanning lines and the azimuth tracking error is by 0.1 the distance of one scanning line. If still higher repetition rates are utilized, errors of 0.01 or 0.001 of the line distance may be detected. This information may readily be utilized as is hereafter described to increase the resolution of the system, or to provide for an azimuth correction at the same time the elevation correction is provided utilizing only two cameras.

The counters 290 and 291, to which are supplied the counting pulses, control a subtracting circuit 201 which provides a running indication of the difference between the binary numbers as registered in the counters 290 and 291. The binary digital difference is converted to an analog representation by the converter 205 and coupled to a switching circuit 276. The switching circuit 276 is a two-position device which is controlled by the vertical synchronizing pulses from the generator 219. During the time that the cameras 210 and 211 are scanning the theodolite field to determine the respective vertical dimensions from the edge of the field to the missile image, the switching circuit 276 is set to steer the analog error indication from the converter 205 to the elevation control motor 226. The error indication is also provided to a tape recorder in a manner similar to that described above in reference to FIGURES 1 and 2. The digital error signals from the circuit 301 are coupled through a switching circuit 293 which is similar to the circuit 276. When the next vertical synchronizing pulse is provided from the generator 219 to switch the scanning patterns of the cameras 210 and 211, it also operates the switching circuit 276 and the circuit 293 to respectively switch the path for the analog error indication to pass to the azimuth control motor 226 instead of to the elevation control motor 227, and to switch the path from the circuit 301 to the track for the azimuth errors. A gating arrangement similar to the arrangement 122 in FIGURE 2 gates the signals to the recorder.

The analog error indication for successive frames represents, therefore, alternatively the elevation and the azimuth tracking errors. The control motors 226 and 227 respectively may include storage means 226a and 227a for retaining the analog error indication during the successive frames and during blanking intervals until an error indication is again provided thereto.

As described above, when the repetition rate is greater than the horizontal line frequency, an azimuth error indication may be provided at the same time the elevation error indication is provided. As shown in phantom, the binary registrations of the counters 290 and 291 may be coupled through gates 309 and 310 to subtracting circuit 311. With the counting pulses at a repetition rate of 157,500 pulses per second, and the two registrations being 1507 and 2006, the output of the circuit 311 is 1. The circuit 311 only considers the binary equivalent of the last decimal digit of each number, subtracting them to determine the correction. If the repetition rate of the counting pulses was 100 times the horizontal line frequency, the circuits 311 would consider the binary equivalent of the last two digits of the registered numbers.

The output from the circuit 311 is then processed through a switch in a manner similar to the output from the circuit 301 except that the correction is applied to the opposite control motor. The resolution achieved depends upon the repetition rate of the counting pulses.

In the embodiment shown in FIGURE 5, the single television camera 410 is utilized instead of four or two cameras in the embodiments described above. The various components shown in FIGURE 5 which are similar to the components shown in FIGURES 1 and 2 have similar reference designations except for the addition of 400 thereof. The camera 410, for example, is similar to the camera 10 shown in FIGURE 1. The camera 410 is controlled by the synchronizing generator 419 which supplies the scanning, blanking and synchronizing signals to a switching circuit 414. The switching circuit 414, which may include electronic or electromagnetic components such as a stepping switch, has four switching states and is controlled by a four-stage ring counter 415. The counter 415 is stepped by the vertical synchronizing pulses from the synchronizing generator 419. The four-stage counter 415 successively energizes its output leads 0 through 3 to successively and cyclically set the switching circuit 414 to its four switching states.

With the switching circuit 414 set in its first switching state, the camera 410 is operated to scan the theodolite field from the left in a manner similar to that indicated for the camera 10 in FIGURE 3. When the switching circuit 414 is set to its second switching state, the camera 410 scans the theodolite field in a manner similar to that indicated for the camera 11 in FIGURE 3. The third and the fourth switching states cause the camera 410 to scan the theodolite field respectively from the bottom and from the top in a similar manner as indicated by the cameras 12 and 13 in FIGURE 3. Under control of the vertical synchronizing pulses, therefore, a complete scanning sequence includes four successive scanning frames each in a different direction across the theodolite field with each pair of scanning frames being in opposite directions. Assuming first that the camera 410 scans the field from the left to determine the vertical dimension A, the television signals are coupled through the blanking circuit 420, the absolute value circuit 450 and the comparator circuit 460 to reset the flip-flop circuit 470. These components function in a manner similar to that described above in reference to the corresponding components shown in FIGURES 1 and 2 and also in FIGURE 4.

The flip-flop circuit 470 is successively set by the vertical synchronizing pulses so that the duration that it remains set is an indication of the dimension of the field scanned before the missile is detected. When the flip-flop circuit 470 is set, it enables the gate 480 coupled to its output terminal 1, and when it is reset it steps a two-step counter 485 coupled to its output terminal 0. Such flip-flop circuits having two output terminals successively energized as the circuit is set and reset are conventional in the art.

When the counter 485 is first operated by the flip-flop circuit 470 in the scanning sequence, it is stepped to energize its output terminal 1. The counter 485 does not, therefore, perform a function when the flip-flop circuit 470 is reset during the first scanning frame in the four frame sequence. The gate 480 which is disabled when the flip-flop circuit 470 is reset passes the counting pulses, during the time it is enabled, to the counter 490. The counter 490 in this manner provides a binary indication of the distance A (FIGURE 3) from the top of the field to the image of the missile.

The binary indication is supplied from the counter 490 to a switching circuit 495 which is controlled by the vertical synchronizing pulses from the synchronizing generator 419. With the switching circuit 495 in one condition, the binary information is provided to a register 496 and with the switching circuit 495 operated by the next vertical synchronizing pulse after the first frame, the binary information is provided to the register 497. The register 496, to which the binary information for the first scanned frame is provided, functions as a memory to store the binary digital information until the second scanning frame is completed so that a difference between the digital information for the two frames may be provided. A tracking error indication is, therefore, not provided after the first scanning frame but only after two successive frames have been scanned.

The vertical synchronizing pulse which follows the first scanning frame sets the circuit 470, resets the counter 490 and operates the switching circuit 495 and a counter 499.

As is hereinafter described, the counter 499 controls a gate 506 which forms part of the communication channel between the subtracting circuit 501 and the two control motors 426 and 427. When the counter 499 is set to energize its ouput terminal 1 responsive to the first vertical synchronizing pulse after the first frame, it enables the gate 506. When the counter 499 is stepped by the next vertical synchronizing pulse it resets the counters 496 and 497 to ready them for the azimuth tracking error sequence during the 3rd and 4th frames.

To recapitulate, the first synchronizing pulse after the first frame performs the following functions:

(1) It sets the flip-flop circuit 470 to commence the second counting sequence;

(2) It resets the counter 490;

(3) It operates the switching circuit 495 to steer the counting information to the register 497; and (4) It steps the counter 499 to energize its output terminal 1 and open the gate 506.

The communication channel to the control motors 426 and 427 remains disabled after the first synchronizing pulse at the gate 507 until the flip-flop circuit 470 is reset.

During the second scanning frame, the camera 410 scans the theodolite field from the right with the successive horizontal scans beginning at the lower end of the field and then progressing successively toward the top to determine the dimension B in FIGURE 3. When the missile is detected, the flip-flop circuit 470 is reset to disable the gate 480 and to operate the counter 485 to energize its output terminal 2. With the gate 480 disabled, the counter 490 provides a binary indication of the number of scanned lines in the second frame preceding the disablement of the gate 480. The binary indication is coupled through the switching circuit 495 to the register 497.

The subtracting circuit 501 provides a continuous indication of the difference in the binary information register in the registers 496 and 497. The output of the subtracting circuit 501 is converted to an analog representation by the converter 505 and introduced therefrom to the serially connected gates 507 and 506. The gate 507 is enabled when the counter 485 is set to its second stage by the flip-flop circuit 470 responsive to the detection of the missile image in the second frame. The gate 507 is, in this manner, enabled when the missile is detected in the second and fourth scanning frames in the four frame sequence. The gate 506 was enabled by the vertical synchronizing pulse which followed the first scanning frame so that the gate 506 is also enabled when the gate 507 is enabled. The analog information is, therefore, coupled through the gates 507 and 506 to a switching circuit 476.

The switching circuit 476 is a two-stage switching circuit similar to the switching circuit 495 and which is controlled by the counter 499. With the counter 499 set at its first stage, the switching circuit 476 couples the analog error information to the elevation control motor 426. When the counter 499 is set to its second stage by the second vertical synchronizing pulse, the switching circuit 476 is operated to couple any error signal provided thereto to the elevation control motor 427.

When the second vertical synchronizinz pulse is provided from the generator 419, it operates the counter 499 to disable the gate 506, to couple a pulse through the capacitor 498 to reset the registers 496 and 497 and to operate the switching circuit 476. The vertical synchronizing pulse also sets the flip-flop circuit 470, resets the counter 490 and operates the switching circuit 495. The sequence of operations thereafter continues in a manner similar to that described above except that the scanning is now to determine the azimuth tracking error instead of the elevation tracking error.

An elevation error signal is coupled through the switching circuit 476 during the interval between the detection of the missile image in the second frame and the end of the second frame when the second vertical synchronizing pulse is provided. The storage elements 426a and 427a respectively associated with the motors 426 and 427 function to extend the correction interval.

The operation of the system during the third and fourth successive scans by the camera 410 of the theodolite field are similar to those indicated for the cameras 212 and 213 in FIGURE 3. The binary indications are provided in a similar manner as that described above to successively provide indications of the lengths (dimensions C and D in FIGURE 3) of the field scanned before the missile image is detected. The subtracting circuit 501 provides the error indication in binary form to the converter 505 which converts it to an analog indication thereof. The analog indication of the error signal is coupled through the gates 506 and 507 during the time following the detection of the missile in the fourth frame when the gate 507 is enabled until the fourth vertical synchronizing pulse, which disables the gate 506.

In this manner, a single camera 410 is controlled during a four frame cycle to scan the field in four different directions to determine the azimuth and the elevation tracking errors.

Although this application has been disclosed and illustrated with reference to particular applications, the principles involved are susceptible of numerous other applications which will be apparent to persons skilled in the art. For example, as shown in phantom in FIGURE 4, the registration in the counters 290 and 291 may be gated through gate 309 and 310 to the tape recorder. The successive counts during each scan are in this manner separately recorded. With the counting repetition rate at 157,500 pulses per second an indication is recorded not only of the respective dimensions A, B, C and D in FIGURE 3 but also where along the particular detecting line the missile image is detected. The invention may also be utilized as part of a homing in a moving vehicle, the controls of which are adjusted in accordance with the determined tracking errors instead of the theodolite motors. Though visible light is utilized for providing the theodolite image, the invention also contemplates the utilization of an infra-red detecting system which supplies infra-red images to converters for deriving the visible field which is scanned by the cameras. The invention is, therefore, to be limited only as indicated by the scope of the appended claims.

We claim:

1. In a visible light tracking system for rapidly moving aircraft, an adjustable telescope for providing an image of the moving aircraft and of the background sky behind the moving aircraft, line scanning means coupled to said telescope for scanning the image in four different directions and for providing four series of electrical signals in accordance therewith indicating when the moving aircraft is being scanned and when the background sky is being scanned, counting means coupled to said scanning means for measuring the interval of each of said series of electrical signals before an indication is provided that the image of the moving aircraft is being scanned, and means coupled to said counting means for converting said measured intervals to indications of the tracking errors of said telescope.

2. In a system for determining the tracking error of apparatus tracking a moving member, first means for scanning a viewed field including an image of the moving member in a predetermined pattern and for providing a first series of electrical signals in accordance therewith, second means for scanning the viewed field in a predetermined pattern which is different than the predetermined pattern of said first means and for providing a second series of electrical signals in accordance therewith, and means coupled to said first and said second means for combining said first and said second series of electrical signals to derive an error signal indicating the variation of the position of the image of the moving member from a central location in said viewed field.

3. In a tracking system for a high speed moving member, optical means for viewing the moving member and for providing a visible field which includes an image of the moving member, means coupled to said optical means for successively scanning the visible field with alternate scanning frames being in accordance with different scanning patterns, means coupled to said scanning means for determining the duration from the beginning of each scanning frame until the image of the moving member is scanned and for providing a signal indicating the determined duration, and means coupled to said determining and providing means for generating an error signal representing the difference between two successively provided signals from said determining and providing means.

4. In a tracking system for a high speed moving member, adjustable optical means for viewing the moving member and for providing a visible field which includes an image of the moving member, means coupled to said adjustable optical means for successively scanning the visible field with alternate scanning frames being in accordance with different scanning patterns, means coupled to said scanning means for determining the duration from the beginning of each scanning frame until the image of the moving member is scanned and for providing a signal indicating the determined duration, means coupled to said determining and providing means for generating an error signal representing the difference between two successively provided signals from said determining and providing means, and means coupled to said generating means and to said adjustable optical means for adjusting said adjustable optical means to change the position of the moving image in the visible field in a direction to reduce the difference between two successively provided signals from said determining and providing means.

5. In a system for determining the tracking error of apparatus tracking a moving member, first means for scanning a viewed field including an image of the moving member in a predetermined pattern and for providing a first series of electrical signals in accordance therewith, second means for scanning the viewed field in a predetermined pattern which is different than the predetermined pattern of said first means and for providing a second series of electrical signals in accordance therewith, means coupled to said first and said second means for combining said first and said second series of electrical signals to derive an error signal indicating the variation of the position of the image of the moving member from a central location in said viewed field, and means coupled to said combining means for adjusting the tracking apparatus in accordance with the error signal to correct the tracking error.

6. In a system for determining the tracking error of apparatus tracking a moving member, first means for scanning a viewed field including an image of the moving member in a predetermined pattern and for providing a first series of electrical signals in accordance therewith, second means for scanning the viewed field in a predetermined pattern which is different than the predetermined pattern of said first means and for providing a second series of electrical signals in accordance therewith, and means coupled to said first and said second means for combining said first and said second series of electrical signals to derive an alarm indication when the first and second series of signals indicate that the moving member is not detected by either said first or said second scanning means.

7. In a system for determining the tracking error of apparatus tracking a moving member, first means for scanning a viewed field including an image of the moving member in a predetermined pattern and for providing a first series of electrical signals in accordance therewith second means for scanning the view field in a predetermined pattern which is different than the predetermined pattern of said first means and for providing a second series of electrical signals in accordance therewith, means coupled to said first and said second means for combining said first and said second series of electrical signals to derive an alarm indication when the first and second series of signals indicate that the moving member is not detected by either said first or said second scanning means, and means coupled to said first and said second means for combining said first and said second series of electrical signals to derive an error signal indicating the variation of the position of the image of the moving member from a central location in said viewed field.

8. In a system for determining the tracking error of a telescope which is tracking a moving vehicle, means optically coupled to the telescope for providing two indentical images of the telescope field which includes an image of the moving vehicle, line scanning means for scanning the identical images in accordance with different line scanning patterns and for developing two series of line-scan electrical signals in accordance therewith, means coupled to said line scanning means for receiving said series of electrical signals and for recognizing when each of the series of electrical signals indicates that the image of the moving vehicle is being scanned in the field, and means coupled to said receiving and recognizing means for developing a tracking error signal in accordance with the difference between the duration in one of the series of electrical signals until the vehicle image is recognized and the duration in the other of the series of electrical signals until the vehicle image is recognized.

9. In a system for determining the tracking error of telescopic apparatus tracking a moving vehicle, line scanning means coupled to the telescopic apparatus for scanning the telescopic field provided by the apparatus and for developing line-scan video signals in accordance therewith, means coupled to said scanning means for recognizing a change of the video signals indicative of the moving vehicle, and means jointly controlled by the video signals from said line scanning means and by said recognizing means for determining if the image of the moving vehicle is not centered in the telescopic field and for determining the amount of decentering of the vehicle image, and means coupled to said determining means for providing a signal in accordance with the determined amount of decentering which represents the tracking error.

10. In a system for determining the centering error of an image of a moving member in a field of view, means for scanning the field of view, means coupled to said scanning means for determining the distances in said field between the image of the moving member and two opposite edges of said field, means coupled to said determining means for successively providing two signals representing the two determined distances, and means coupled to said successively providing means for subtracting one of said two signals from the other to determine the centering error of the image of the moving member in the field of view.

11. In a visible light tracking system for rapidly moving aircraft, an adjustable telescope for providing an image of the moving aircraft and of the background sky behind the moving aircraft, line scanning means coupled to said telescope for scanning the image in four different directions and for providing four series of electrical signals in accordance therewith, means coupled to said scanning means for individually receiving said four series of electrical signals and for recognizing in each of said series of electrical signals a change indicating that the image of the moving craft is being scanned instead of the background sky, means associated with each of said four series of signals and coupled to said receiving and recognizing means for counting the number of scanning lines utilized to scan the background sky before the image of the moving craft is first recognized, and means coupled to said counting means for combining the counted number of lines derived from scanning in each direction with the counted number of lines derived from scanning in the opposite direction to develop two signals representing the tracking azimuth and elevation errors.

12. In a system for determining the tracking error of a theodolite following a moving aircraft, means coupled to the theodolite for providing two identical images of the theodolite field, line scanning means for scanning each of said two identical images in opposite directions starting at opposite ends of the said two identical images, means coupled to said line scanning means for recognizing when said line scanning means is scanning the image of the moving aircraft and for providing an output signal indicating when the image of the moving aircraft is being scanned, counting means coupled to said recognizing means and synchronously operated with said line scanning means for providing signals indicating the number of lines scanned across each of said two identical images before the image of the moving aircraft is recognized as indicated by said output signal, and means coupled to said counting means for periodically combining said indicating signals for said two identical images to develop a tracking error signal in accordance therewith.

13. In a system for determining the tracking error of a theodolite following a moving aircraft, means coupled to the theodolite for providing two identical images of the theodolite field, line scanning means for scanning each of said two identical images in opposite directions starting at opposite ends of the said two identical images, means coupled to said line scanning means for recognizing when said line scanning means is scanning the image of the moving aircraft and for providing an output signal indicating when the image of the moving aircraft is being scanned, counting means coupled to said recognizing means and synchronously operated with said line scanning means for providing signals indicating the number of lines scanned across each of said two identical images before the image of the moving aircraft is recognized as indicated by said output signal, means coupled to said counting means for periodically combining said indicating signals for said two identical images to develop a tracking error signal in accordance therewith, and means coupled to said combining and developing means for adjusting the position of said theodolite in accordance with said tracking error signal to correct the tracking error.

14. In a visible light tracking system for rapidly moving aircraft, an adjustable telescope for providing an image of the moving aircraft and of the background sky behind the moving aircraft, line scanning means including only a single television camera for successively scanning the image in four different directions and for providing four series of electrical signals in accordance therewith indicating when the moving craft is being scanned and when the background sky is being scanned, counting means coupled to said scanning means for measuring the interval of each of said series of eelctrical signals before an indication is provided that the image of the moving aircraft is being scanned, and means coupled to said counting means for combining each pair of successively measured intervals to successively determine the azimuth and elevation tracking errors of the adjustable telescope.

15. In a visible light tracking system for rapidly moving aircraft, an adjustable telescope for providing an image of the moving aircraft and of the background sky behind the moving aircraft, line scanning means including only a single television camera for successively scanning the image in four different directions and for providing four series of electrical signals in accordance therewith indicating when the moving craft is being scanned and when the background sky is being scanned, counting means coupled to said scanning means for measuring the interval of each of said series of electrical signals before an indication is provided that the image of the moving aircraft is being scanned, means coupled to said counting means for combining each pair of successively measured intervals to successively determine the azimuth and elevation tracking errors of the adjustable telescope, and means coupled to said combining means for deriving error signals indicating the tracking errors and for automatically adjusting said telescope to compensate for the tracking errors.

16. In a system for determining the tracking error of telescopic apparatus tracking a moving vehicle, means coupled to the telescopic apparatus for scanning the telescopic field provided by the apparatus, means coupled to said scanning means for determining if the image of the moving vehicle is not centered in the telescopic field and for determining the amount of decentering of the vehicle image, and means coupled to said determining means for providing a signal in accordance with the determined amount of decentering which represents the tracking error, said scanning means including a television camera, a source of scanning, synchronizing and blanking signals for operating said camera, and switching means controlled by the synchronizing signals from said source for successively switching the paths of the scanning, synchronizing and blanking signals from said source to said camera so that the scanning pattern of said camera is cyclically changed for each of four successive scanning frames.

17. In a system for determining a tracking error of a telescope which is tracking a moving vehicle, means optically coupled to the telescope for providing two identical images of the field viewed at the eyepiece of the telescope which field may include an image of the moving vehicle, line scanning means for synchronously scanning the two identical images line by line in accordance with two different line scanning patterns and for developing two series of line-scan electrical signals in accordance therewith, means coupled to said line scanning means for receiving said series of electrical signals and for recognizing when each of the series of electrical signals indicates that the image of the moving vehicle is being scanned in the field, and means coupled to said receiving and recognizing means for developing a tracking error signal initiating in each scanning frame of said line scanning means when either of said series of electrical signals first indicates that the moving vehicle is being scanned so that duration during which a tracking error signal is provided relates to the size of the error.

18. In a system for determining the tracking error of a telescopic apparatus tracking a moving vehicle, line scanning means coupled to the telescopic apparatus for scanning the telescopic field provided by the apparatus, means coupled to said scanning means for determining if the image of the moving vehicle is not centered in the telescopic field and for determining the amount of decentering of the vehicle image, and means coupled to said determining means for providing a signal having both a magnitude and a duration related to the determined amount of decentering which represents the tracking error.

19. A method of determining the tracking error of a telescope tracking a moving member including the steps of splitting the telescope field to provide two identical images, scanning the two identical images in different directions to develop two different sets of line scanning signals which indicate when the image of the moving member is being scanned, counting the line scans in each of the two sets before the image of the moving member is first scanned, and comparing the count of the line scans for the two sets and developing an error signal in accordance with their difference.

20. A method of determining the tracking error of a telescope tracking a moving member including the steps of scanning the telescope field in two different line scan patterns to develop two different sets of line scan signals which indicate when the image of the moving member is being scanned, counting the line scans in each of the two sets before the image of the moving member is first scanned, and comparing the count of the line scans for the two sets and developing an error signal in accordance with their difference.

21. In a tracking system for a rapidly moving vehicle, means for viewing the vehicle and for providing an image of the moving vehicle and of the background behind the moving vehicle, scanning means for scanning the image and for providing a series of electrical signals in accordance therewith indicating when the moving vehicle is being scanned and when the background sky is being scanned, means coupled to said scanning means for measuring the interval of said series of electrical signals before an indication is provided that the image of the moving vehicle is being scanned, and means coupled to said measuring means for converting the measured interval into an indication of the tracking error of the viewing means.

References Cited in the file of this patent

UNITED STATES PATENTS 2,403,023     Reynolds _____ July 2, 1946